(12) United States Patent
Bhatta et al.

(10) Patent No.: US 11,628,883 B2
(45) Date of Patent: Apr. 18, 2023

(54) VEHICLE HAVING LOAD TRANSFER ASSEMBLY

(71) Applicants: Lakshmi P Bhatta, Troy, MI (US); Zheng Qin, Troy, MI (US); Hassan H El-Hor, Ann Arbor, MI (US)

(72) Inventors: Lakshmi P Bhatta, Troy, MI (US); Zheng Qin, Troy, MI (US); Hassan H El-Hor, Ann Arbor, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/130,226

(22) Filed: Dec. 22, 2020

(65) Prior Publication Data

US 2022/0194473 A1    Jun. 23, 2022

(51) Int. Cl.
    *B62D 21/15*    (2006.01)
    *B60R 19/18*    (2006.01)
    *B60R 19/24*    (2006.01)

(52) U.S. Cl.
    CPC ............ *B62D 21/152* (2013.01); *B60R 19/18* (2013.01); *B60R 19/24* (2013.01); *B60R 2019/1813* (2013.01)

(58) Field of Classification Search
    CPC ....... B62D 21/152; B60R 19/18; B60R 19/24; B62R 2019/1813
    See application file for complete search history.

(56) References Cited

U.S. PATENT DOCUMENTS

| | | | |
|---|---|---|---|
| 8,454,080 B2 | 6/2013 | Qu et al. | |
| 8,807,632 B2 * | 8/2014 | Ramoutar | B60R 19/24 293/133 |
| 2016/0101751 A1 | 4/2016 | Bou et al. | |

* cited by examiner

*Primary Examiner* — D Glenn Dayoan
*Assistant Examiner* — Melissa Ann Bonifazi
(74) *Attorney, Agent, or Firm* — Ralph E. Smith

(57) ABSTRACT

A vehicle includes a vehicle frame, a vehicle bumper and a load transfer assembly. The vehicle bumper is coupled to a front end of the vehicle frame and includes a center beam and a bumper beam extension that extends laterally from an end of the center beam. The load transfer assembly includes first and second pivot pins and a load beam. The first pivot pin is fixed to the bumper beam extension and the second pivot pin is fixed to the vehicle frame. The load beam has a first end pivotably coupled to the first pivot pin and a second end pivotably coupled to the second pivot pin. The load beam is configured to load the vehicle frame in a lateral direction upon a vehicle impact event.

15 Claims, 7 Drawing Sheets

VEHICLE HAVING LOAD TRANSFER ASSEMBLY

FIELD

The present disclosure relates to a vehicle having a load transfer assembly.

BACKGROUND

This section provides background information related to the present disclosure and is not necessarily prior art.

Most motor vehicles are equipped with bumper systems such as front and rear bumpers that are attached to a vehicle frame and intended in part to protect vehicle occupants against injury during a crash event. By absorbing some of the energy of the crash, a bumper system reduces the vehicle crash intrusion, which can help to reduce energy transferred to the occupant cabin. Some motor vehicles further include bumper extensions that extend laterally from ends of the bumper, for example. Such bumper extensions further assist to an extent in reducing the vehicle crash intrusion.

SUMMARY

This section provides a general summary of the disclosure, and is not a comprehensive disclosure of its full scope or all of its features.

The present disclosure provides a load transfer assembly that transfers a load of the front vehicle impact event in a lateral direction thereby deforming a vehicle frame and further reducing energy of the vehicle impact event transferred to other parts of the vehicle such as the occupant cabin. The load transfer assembly also reduces the concentrated intrusions into the barrier or other vehicle, and improves the Moving Progressive Deformable Barrier (MPDB) impact score.

In one form, the present disclosure provides a vehicle that includes a vehicle frame, a vehicle bumper, and a first load transfer assembly. The vehicle bumper is coupled to a front end of the vehicle frame and includes a center beam and a first bumper beam extension extending laterally from a first end of the center beam. The first load transfer assembly includes first and second pivot pins and a first load beam. The first pivot pin is fixed to the bumper beam extension and the second pivot pin is fixed to the vehicle frame. The first load beam has a first end pivotably coupled to the first pivot pin and a second end pivotably coupled to the second pivot pin. The first load beam is configured to load a first portion of the vehicle frame in a lateral direction upon a vehicle impact event.

In some configurations of the vehicle of the above paragraph, the first bumper beam extension includes an upper beam extension and a lower beam extension. The first pivot pin is fixed to the upper beam extension and the lower beam extension.

In some configurations of the vehicle of any one or more of the above paragraphs, the vehicle frame includes an upper rail and a lower load beam. The second pivot pin is fixed to the upper rail via a first bracket and the lower load beam via a second bracket.

In some configurations of the vehicle of any one or more of the above paragraphs, the first load beam is disposed between the upper bumper beam and the lower bumper beam, and between the upper rail and the lower load beam.

In some configurations of the vehicle of any one or more of the above paragraphs, the first load beam extends substantially in a longitudinal direction of the vehicle frame before the vehicle impact event and extends substantially in a lateral direction relative to the vehicle frame after the vehicle impact event.

In some configurations of the vehicle of any one or more of the above paragraphs, the first load beam pivots above first and second axes of the first and second pivot pins, respectively, upon the vehicle impact event.

In some configurations of the vehicle of any one or more of the above paragraphs, the first load beam includes a planar upper side, a planar lower side, and opposing arcuate lateral sides. First and second openings are formed in opposing ends of the planar upper sides and third and fourth openings are formed in opposing ends of the planar lower sides.

In some configurations of the vehicle of any one or more of the above paragraphs, the first pivot pin extends through the first opening and the third opening. The second pivot pin extends through the second opening and the fourth opening.

In some configurations of the vehicle of any one or more of the above paragraphs, the first and second pivot pins extend perpendicularly to a longitudinal direction of the vehicle frame.

In some configurations of the vehicle of any one or more of the above paragraphs, the first load beam is arcuate.

In some configurations of the vehicle of any one or more of the above paragraphs, the load beam is made of a metal material.

In some configurations of the vehicle of any one or more of the above paragraphs, the first load beam further includes a rib extending parallel to the planar upper side and the planar lower side. The rib also interconnects the opposing arcuate lateral sides.

In some configurations of the vehicle of any one or more of the above paragraphs, the vehicle further includes a second load transfer assembly. The second load transfer assembly includes third and fourth pivot pins and a second load beam. The third pivot pin is fixed to a second bumper beam extension that extends laterally from a second end of the center beam, the fourth pivot pin is fixed to the vehicle frame, and the second load beam has a third end pivotably coupled to the third pivot pin and a fourth end pivotably coupled to the fourth pivot pin. The second load beam is configured to load a second portion of the vehicle frame in a lateral direction upon the vehicle impact event.

In some configurations of the vehicle of any one or more of the above paragraphs, the first load beam is hollow.

In some configurations of the vehicle of any one or more of the above paragraphs, the first and second portions of the vehicle frame deform toward each other during the vehicle impact event.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
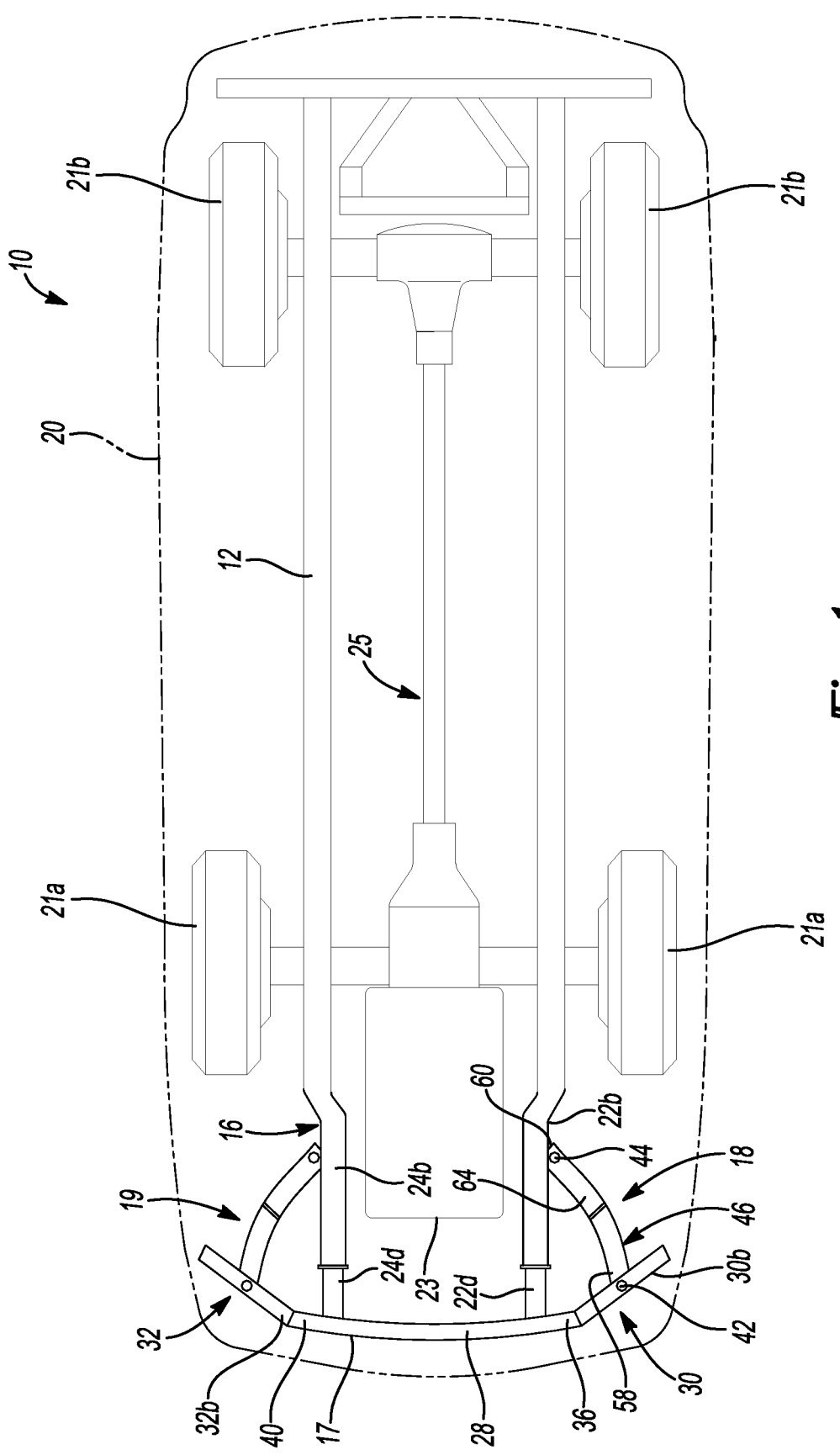
FIG. 1 is a bottom view of a vehicle having first and second load transfer assemblies in accordance with the principles of the present disclosure.

As shown in FIG. 1, a vehicle 10 is provided. The vehicle 10 includes a mainframe or chassis 12, a front sub frame 16, a vehicle bumper 17, and first and second load transfer assemblies 18, 19. The mainframe 12 supports, inter alia, a vehicle body 20 and can at least partially support a powertrain system 23 and a drivetrain system 25. Rotary power generated by the powertrain system 23 is transmitted to the drivetrain system 25 to drive at least one of a set of front wheels 21a and a set of rear wheels 21b. The front sub frame 16 is attached to the mainframe 12 at a front end thereof and at least partially supports the powertrain system 23 and a front suspension system (not shown).

With reference to FIGS. 1, 2 and 5-8, the front sub frame 16 includes a left front rail 22a (FIGS. 2 and 5-8), a left lower load beam 22b (FIGS. 1, 2, and 5-8), a left upper energy absorbing member 22c (FIGS. 2 and 6-8), a left lower energy absorbing member 22d (FIGS. 1, 2 and 7), a right front rail 24a (FIG. 2), a right lower load beam 24b (FIGS. 1 and 2), a right upper energy absorbing member 24c (FIG. 2), and a right lower energy absorbing member 24d (FIG. 1). An upper reinforcement beam (not shown) extends between the left front rail 22a and the right front rail 24a, and a lower reinforcement beam (not shown) extends between the left lower load beam 22b and the right lower load beam 24b.

The energy absorbing members 22c, 22d absorb energy during a vehicle impact event by deforming, compressing, yielding, bending, or any other type of mechanical or electromechanical conversion. The left upper energy absorbing member 22c extends between the left front rail 22a and the vehicle bumper 17, and the lower energy absorbing member 22d extends between the left lower load beam 22b and the vehicle bumper 17. Similarly, the energy absorbing members 24c, 24d absorb energy during a vehicle impact event by deforming, compressing, yielding, bending, or any other type of mechanical or electromechanical conversion. The right upper energy absorbing member 24c extends between the right front rail 24a and the vehicle bumper 17, and the right lower energy absorbing member 24d extends between the right lower load beam 24b and the vehicle bumper 17

Figure 2:
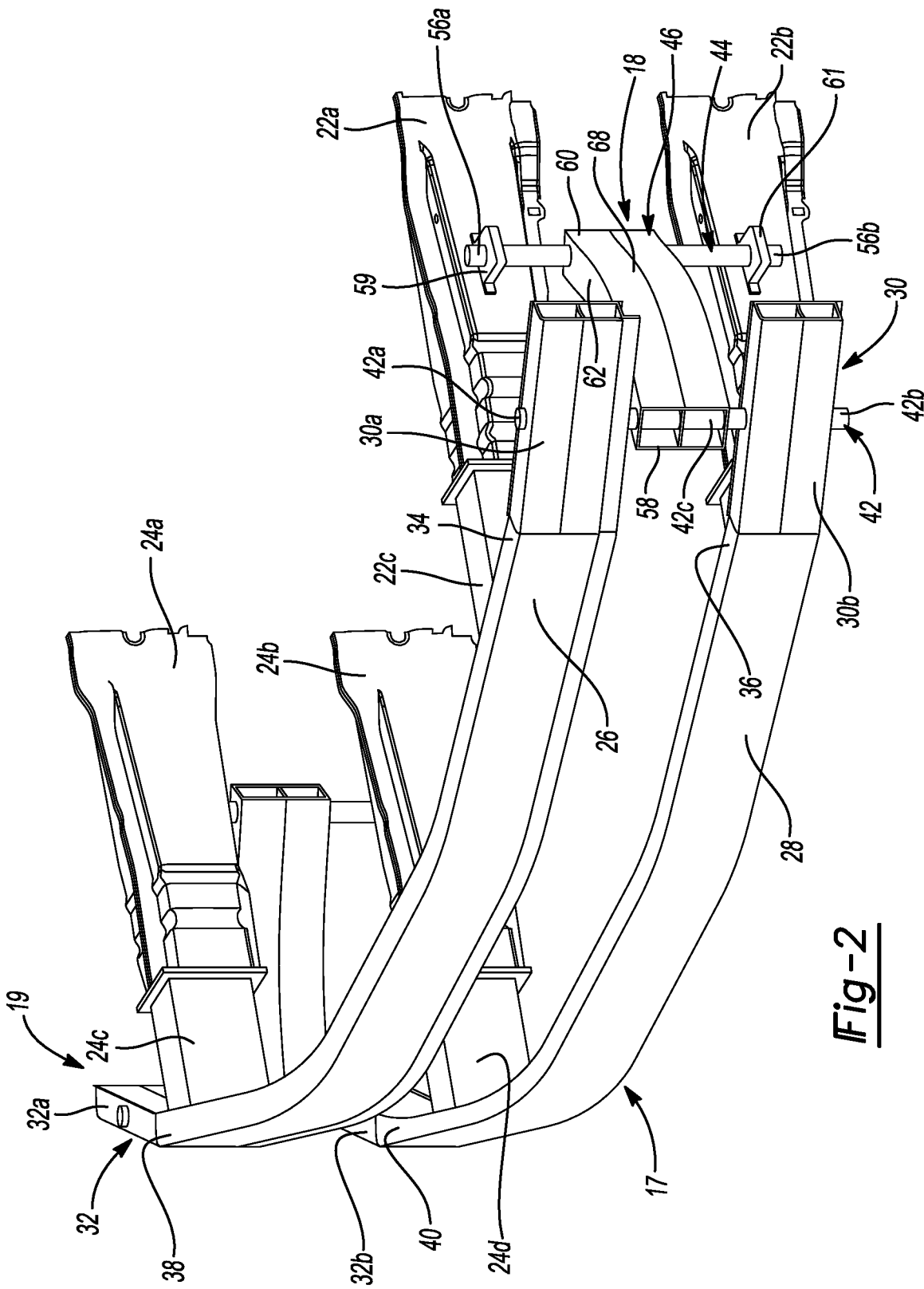
FIG. 2 is a perspective view of the first and second load transfer assemblies attached to a vehicle frame.

With reference to FIGS. 1 and 2, the vehicle bumper 17 includes an upper center beam 26 (FIG. 2), a lower center beam 28, a first bumper beam extension 30 and a second bumper beam extension 32. The upper center beam 26 extends in a transverse direction and is coupled to the upper energy absorbing members 22c, 24c. The lower center beam 28 extends in a transverse direction and is coupled to the lower energy absorbing members 22d, 24d.

The first bumper beam extension 30 includes an upper beam extension 30a (FIGS. 2 and 5-7) and a lower beam extension 30b (FIGS. 1, 2, 5 and 7). The upper beam extension 30a extends laterally outwardly from a first end 34 of the upper center beam 26 and the lower beam extension 30b extends laterally outwardly from a first end 36 of the lower center beam 28 (the upper and lower beam extensions 30a, 30b extend laterally past the left front rail 22a and the left lower load beam 22b).

The second bumper beam extension 32 includes an upper beam extension 32a (FIG. 2) and a lower beam extension 32b (FIGS. 1 and 2). The upper beam extension 32a extends laterally outwardly from a second end 38 of the upper center beam 26 that is opposite the first end 34, and the lower beam extension 32b extends laterally outwardly from a second end 40 of the lower center beam 28 that is opposite the first end 36 (the upper and lower beam extensions 32a, 32b extend laterally past the right front rail 24a and the right lower load beam 24b).

The first load transfer assembly 18 is coupled to the front sub frame 16 and the vehicle bumper 17 and is configured to load the front sub frame 16 in a lateral direction upon a vehicle impact event. The first load transfer assembly 18 includes a first pivot pin 42, a second pivot pin 44 and a load beam 46 disposed between the first and second pivot pins 42, 44. The first pivot pin 42 extends through the upper beam extension 30a, the lower beam extension 30b, and the load beam 46. The first pivot pin 42 defines a longitudinal axis 47 (FIG. 3) that extends perpendicular to a length of the vehicle 10 (the longitudinal axis 47 also extends perpendicular to a width of the vehicle 10). As shown in FIGS. 2-5, the first pivot pin 42 includes an upper section 42a, a lower section 42b and a middle section 42c between the upper and lower sections 42a, 42b. The upper section 42a is fixed to the upper beam extension 30a, the lower section 42b is fixed to the lower beam extension 30b, and the middle section 42c is coupled to the load beam 46. Stated differently, the upper section 42a of the first pivot pin 42 extends through aligned openings of the upper beam extension 30a, the lower section 42b of the first pivot pin 42 extends through aligned openings of the lower beam extension 30b, and the middle section 42c of the first pivot pin 42 extends through the load beam 46.

The second pivot pin 44 is coupled to the left front rail 22a, the left lower load beam 22b, and the load beam 46. The second pivot pin 44 defines a longitudinal axis 55 (FIG. 3) that extends perpendicular to a length of the vehicle 10 (the longitudinal axis 55 also extends perpendicular to a width of the vehicle 10). With reference to FIGS. 2-5, the second pivot pin 44 includes an upper section 56a, a lower section 56b and a middle section 56c (FIG. 4) between the upper and lower sections 56a, 56b. The upper section 56a is fixed to left front rail 22a (via a bracket 59), the lower section 56b is fixed to the left lower load beam 22b (via a bracket 61), and the middle section 56c is coupled to the load beam 46.

Figure 5:
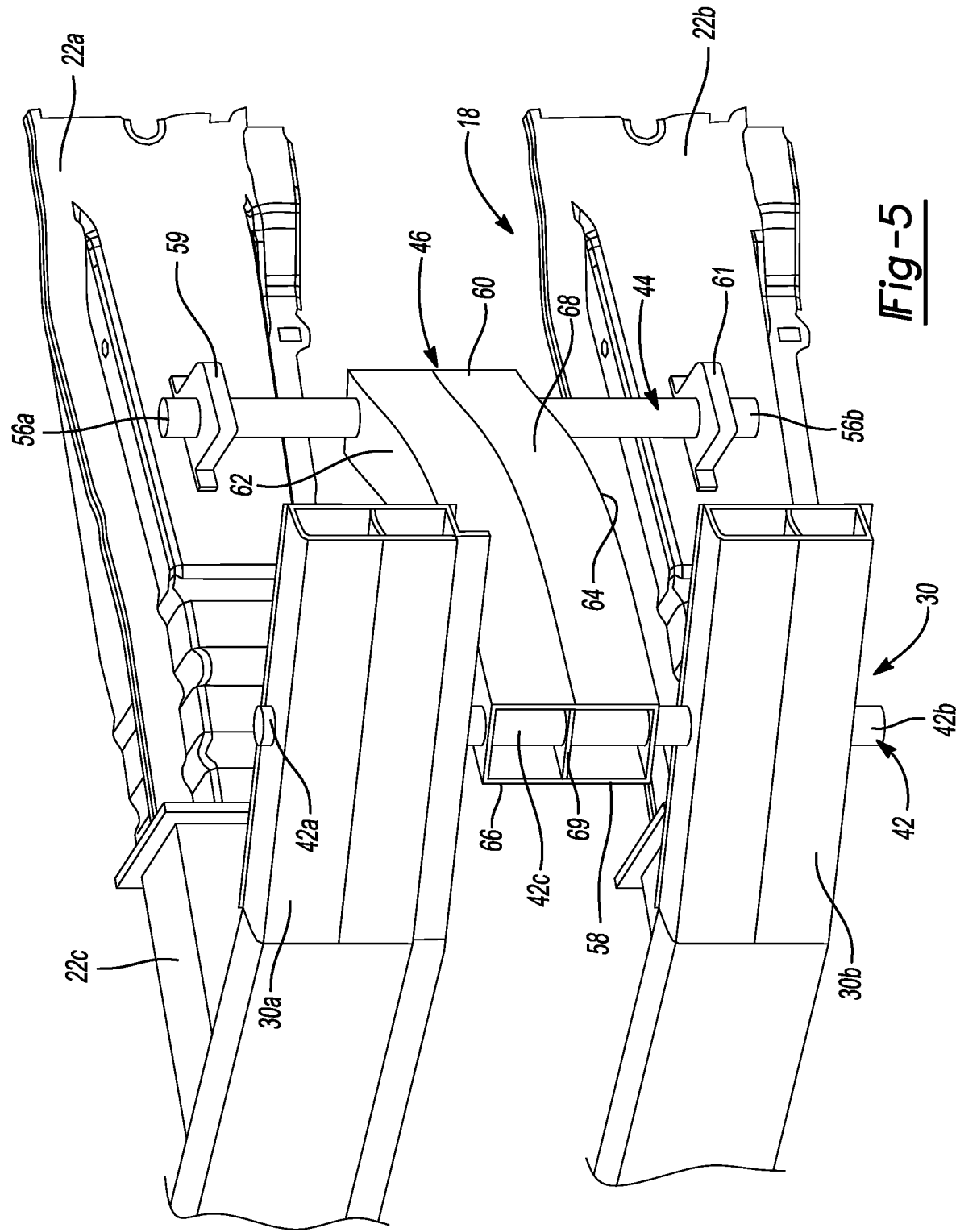
FIG. 5 is a perspective view of one of the load transfer assemblies attached to the vehicle frame.
Figure 6:
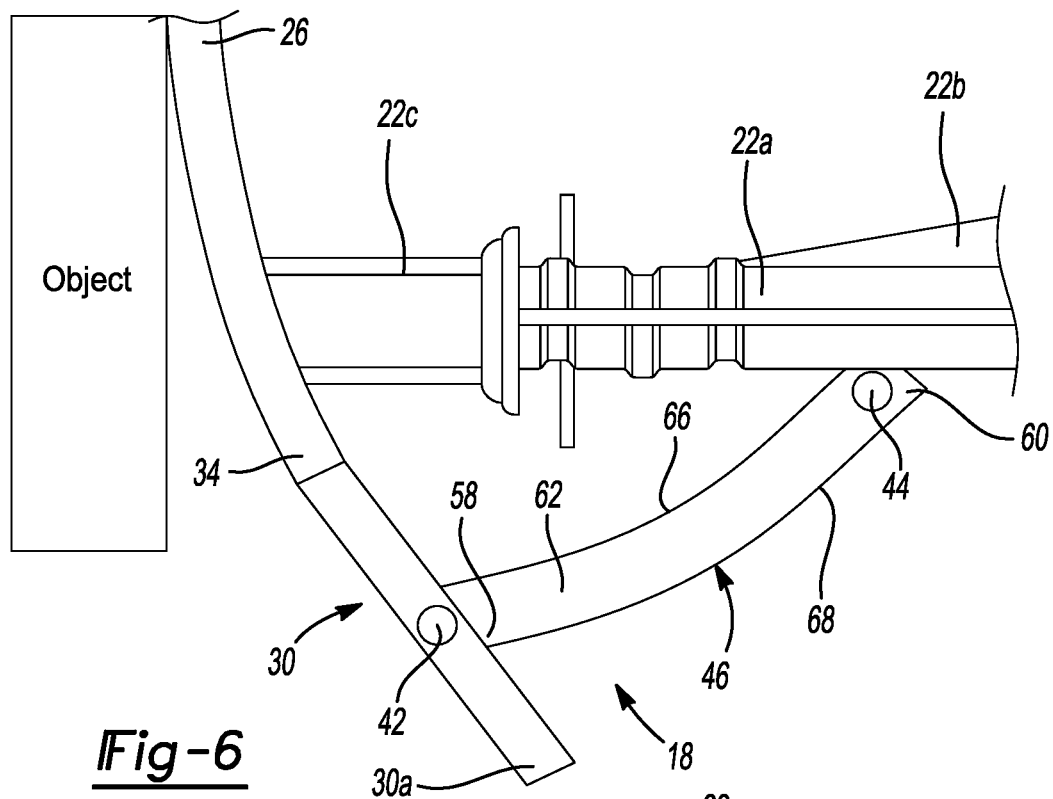
FIG. 6 is a top view of one of the load transfer assemblies attached to the vehicle frame before a vehicle impact event.
Figure 8:
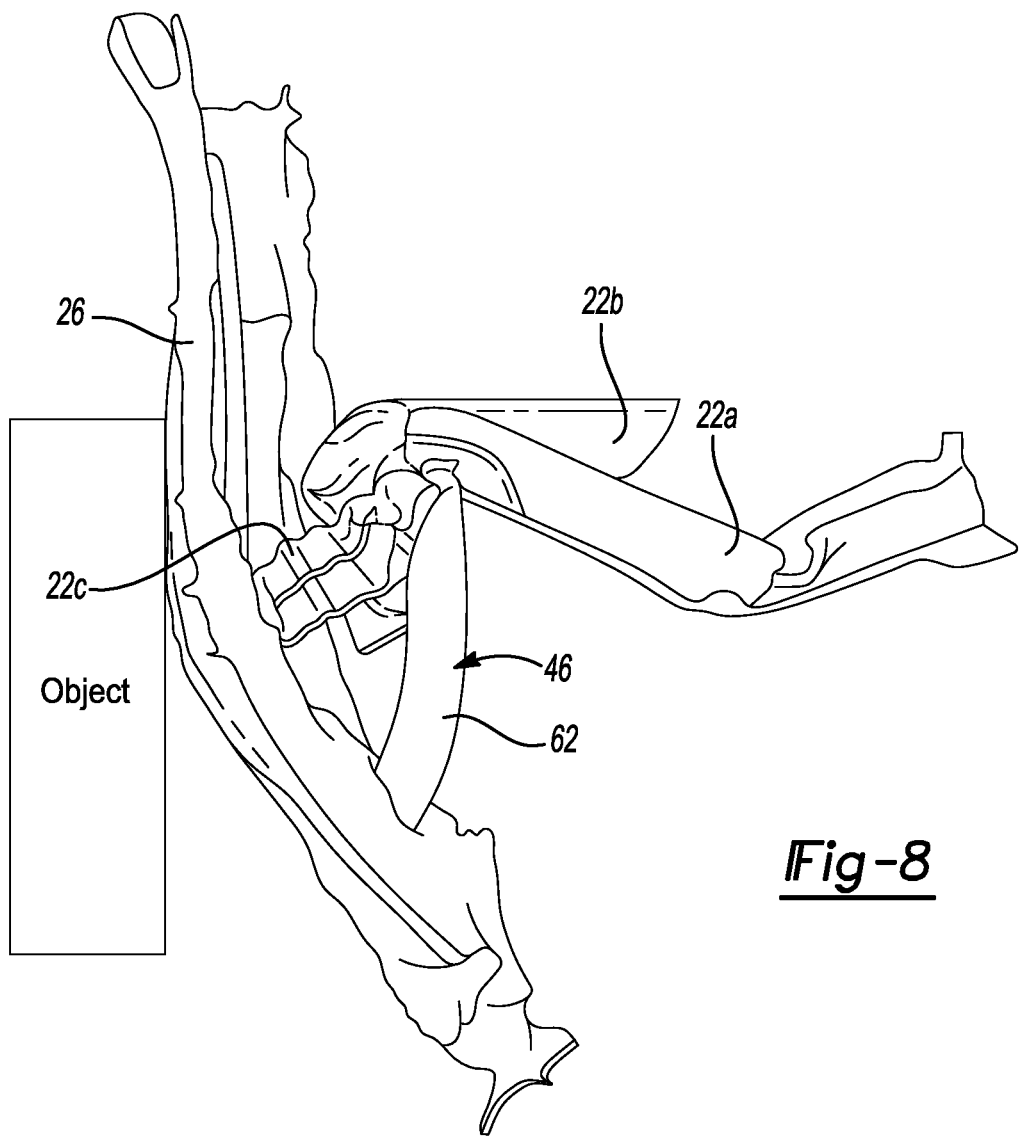
FIG. 8 is a top view of one of the load transfer assemblies attached to the vehicle frame after the vehicle impact event Corresponding reference numerals indicate corresponding parts throughout the several views of the drawings.

The load beam 46 is arcuate shape and is made of a metal material (e.g., aluminum). The load beam 46 is hollow and has a first end 58 and a second end 60 opposite the first end 58. As shown in FIGS. 2 and 5, the first end 58 is disposed between the upper beam extension 30a and the lower beam extension 30b, and the second end 60 is disposed between the left front rail 22a and the left lower load beam 22b. The first end 58 is pivotably coupled to the middle section 42c of the first pivot pin 42, and the second end 60 is pivotably coupled to the middle section 56c of the second pivot pin 44. In this way, the load beam 46 is allowed to swivel about the pivot pins 42, 44 such that the load beam 46 extends substantially in a longitudinal direction of the front sub frame 16 before the vehicle impact event (FIG. 1) and extends substantially in a lateral direction relative to the front sub frame 16 after the vehicle impact event (FIG. 8).

Figure 3:
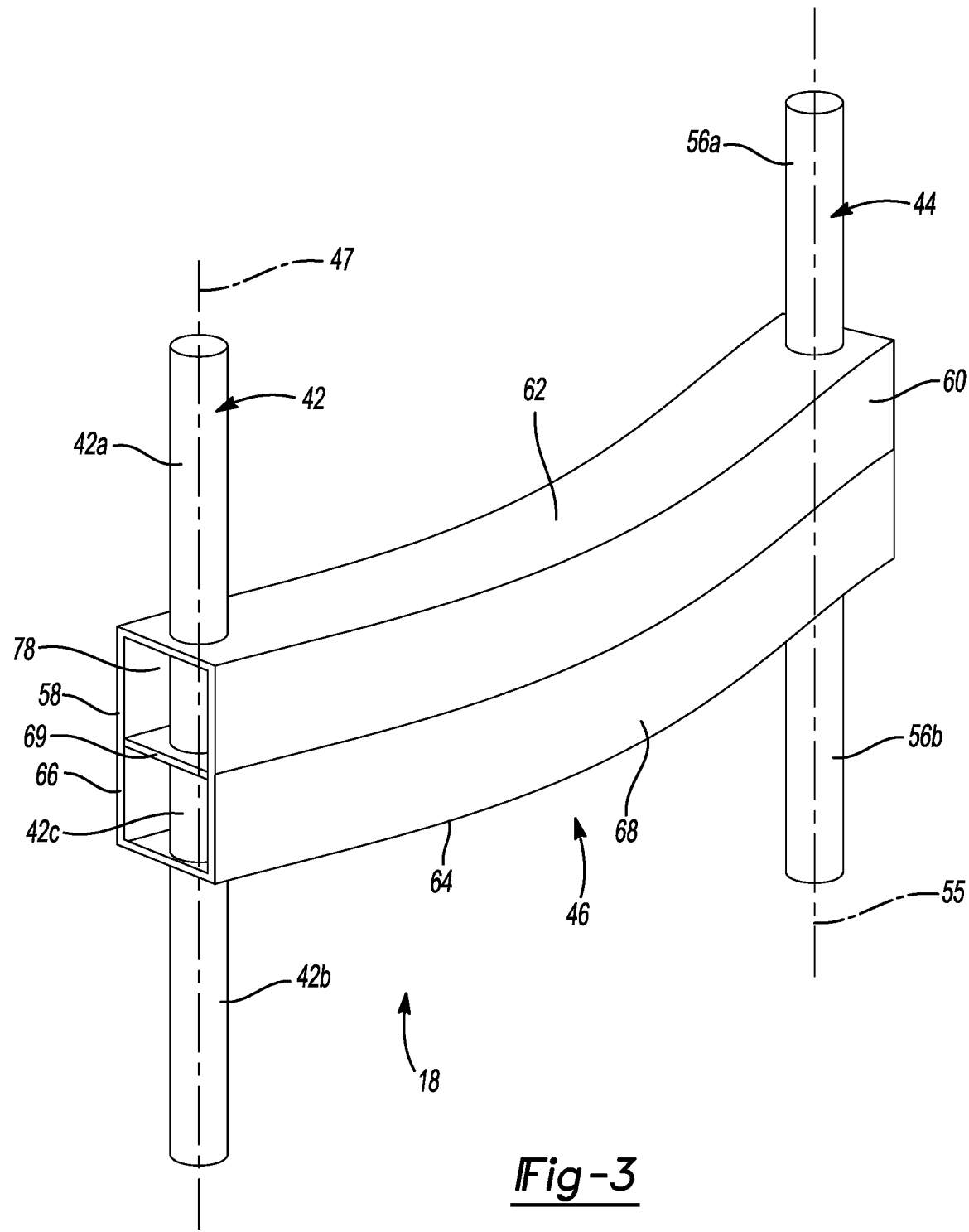
FIG. 3 is a perspective view of one of the load transfer assemblies of FIG. 1.
Figure 4:
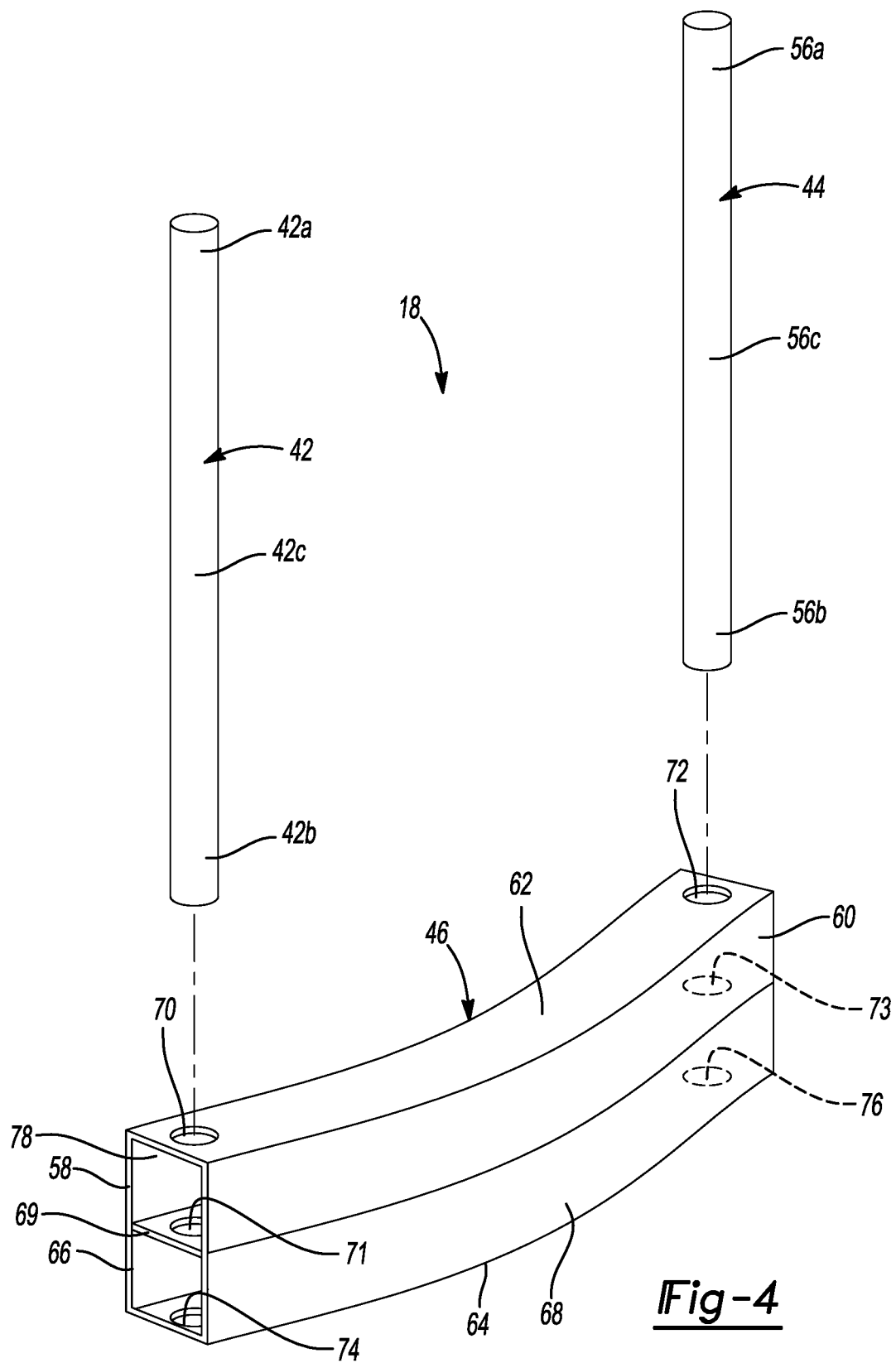
FIG. 4 is an exploded view of one of the load transfer assemblies of FIG. 1.

With reference to FIGS. 3 and 4, the load beam 46 also includes a planar upper side 62, a planar lower side 64, opposing arcuate lateral sides 66, 68, and a rib 69. The planar upper side 62 includes openings 70, 72 formed in opposing ends thereof and the planar lower side 64 includes openings 74, 76 formed in opposing ends thereof. The opening 70 of the planar upper side 62 and the opening 74 of the planar lower side 64 are vertically aligned with each other, and the opening 72 of the planar upper side 62 and the opening 76 of the planar lower side 64 are vertically aligned with each other. In this way, the middle section 42c of the first pivot pin 42 extends through the openings 70, 74, and the middle section 56c of the second pivot pin 44 extends through the openings 72, 76. The rib 69 is disposed within a space 78 of the load beam 46 and extends a length of the load beam 46. The rib 69 extends parallel to the upper side 62 and the lower side 64, and interconnects the lateral sides 66, 68. The middle section 42c of the first pivot pin 42 extends through an opening 71 in the rib 69 and the middle section 56c of the second pivot pin 44 extends through an opening 73 in the rib 69.

The structure and the function of the second load transfer assembly 19 is similar or identical to that of the first load transfer assembly 18 described above, and therefore, will not be described again in detail.

Figure 7:
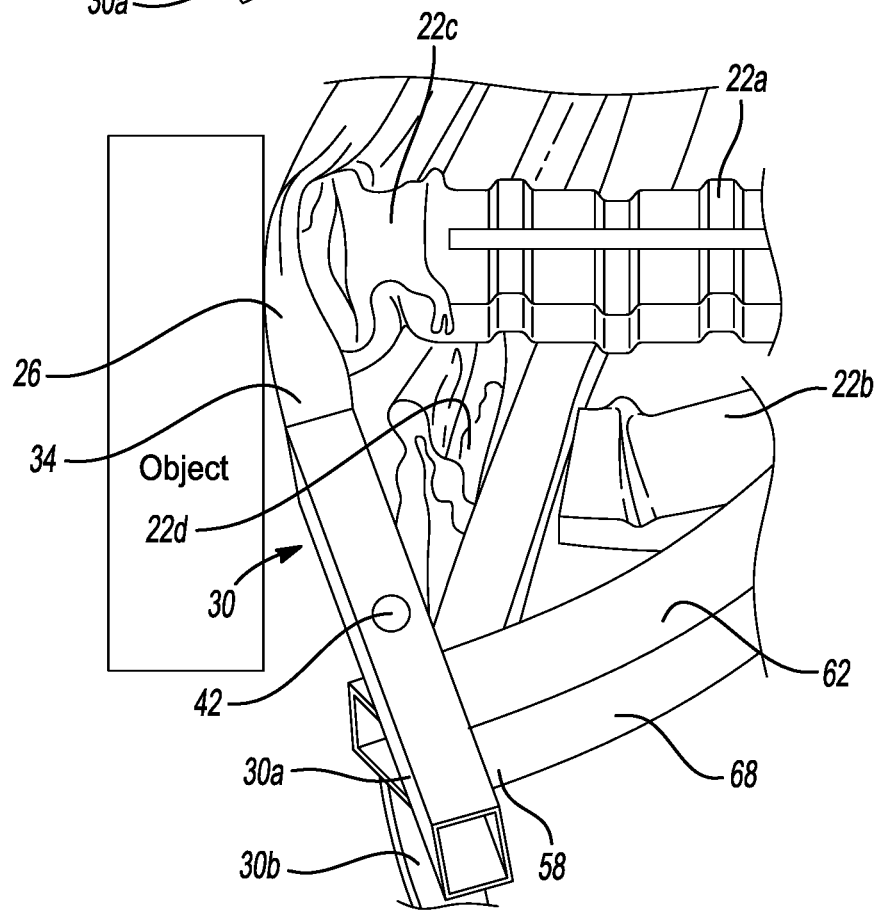
FIG. 7 is a top view of one of the load transfer assemblies attached to the vehicle frame at the beginning of the vehicle impact event.

With continued reference to FIGS. 1-8, operation of the first load transfer assembly 18 will now be described in detail. Although the operation of the first load transfer assembly 18 will be described in detail below, it should be understood that the second load transfer assembly 19 will operate in a similar or identical manner as the first load transfer assembly 18. As shown in FIG. 7, when a front end vehicle impact event occurs (e.g., vehicle 10 colliding with an object such as a rigid barrier or vehicle), the vehicle bumper 17 contacts the object (head on or offset from the vehicle 10), which causes the vehicle bumper 17 to move rearward and the left upper energy absorbing member 22c and the left lower energy absorbing member 22d to deform (compress), thereby absorbing energy of the impact.

As shown in FIG. 8, as the vehicle bumper 17 moves rearward, the load beam 46 swivels about the first and second pivot pins 42, 44, which causes the load beam 46 to load the left front rail 22a and the left lower load beam 22b in the lateral direction, thereby deforming the left front rail 22a and the left lower load beam 22b (the left front rail 22a and the left lower load beam 22b bend inwardly toward a center line of the vehicle 10). Stated differently, as the vehicle bumper 17 moves rearward, the load beam 46 transfers energy from the vehicle impact event to the left front rail 22a and the left lower load beam 22b, which causes the left front rail 22a and the left lower load beam 22b to deform, thereby further reducing energy of the impact event transferred to other parts of the vehicle 10 such as the occupant cabin.

One advantage of the first and second load transfer assemblies 18, 19 provided in the present disclosure is that the load transfer assemblies 18, 19 transfer a load of the front impact event in the lateral direction thereby deforming the front sub frame 16 (causing the left front rail 22a and the left lower load beam 22b to bend inwardly) and further reducing energy of the vehicle impact event transferred to other parts of the vehicle 10 such as the occupant cabin. This also reduces the concentrated intrusions into the object.

What is claimed is:

1. A vehicle comprising:
   a vehicle frame;
   a vehicle bumper coupled to a front end of the vehicle frame and including a center beam and a first bumper beam extension extending laterally from a first end of the center beam; and
   a first load transfer assembly including first and second pivot pins and a first load beam, the first pivot pin fixed to the first bumper beam extension and the second pivot pin fixed to the vehicle frame, the first load beam having a first end pivotably coupled to the first pivot pin and a second end pivotably coupled to the second pivot pin,
   wherein the first load beam includes a planar upper side, a planar lower side, and opposing arcuate lateral sides, and
   the first load beam is configured to load a first portion of the vehicle frame in a lateral direction upon a vehicle impact event.

2. The vehicle of claim 1, wherein the center beam includes an upper center beam and a lower center beam and the first bumper beam extension includes an upper beam extension extending from the upper center beam and a lower beam extension extending from the lower center beam, and wherein the first pivot pin is fixed to the upper beam extension and the lower beam extension.

3. The vehicle of claim 2, wherein the vehicle frame includes an upper rail and a lower load beam, and wherein the second pivot pin is fixed to the upper rail via a first bracket and the lower load beam via a second bracket.

4. The vehicle of claim 3, wherein the first load beam is disposed between the upper bumper beam and the lower bumper beam, and between the upper rail and the lower load beam.

5. The vehicle of claim 1, wherein the first load beam extends substantially in a longitudinal direction of the vehicle frame before the vehicle impact event and extends substantially in a lateral direction relative to the vehicle frame after the vehicle impact event.

6. The vehicle of claim 1, wherein the first load beam pivots about first and second axes of the first and second pivot pins, respectively, upon the vehicle impact event.

7. The vehicle of claim 1, wherein first and second openings are formed in opposing ends of the planar upper sides and third and fourth openings are formed in opposing ends of the planar lower sides.

8. The vehicle of claim 7, wherein the first pivot pin extends through the first opening and the third opening, and wherein the second pivot pin extends through the second opening and the fourth opening.

9. The vehicle of claim 7, wherein the first load beam further includes a rib extending parallel to the planar upper side and the planar lower side, and wherein the rib interconnects the opposing arcuate lateral sides.

10. The vehicle of claim 1, wherein the first and second pivot pins extend perpendicularly to a longitudinal direction of the vehicle frame.

11. The vehicle of claim 1, wherein the first load beam is arcuate.

12. The vehicle of claim 1, wherein the load beam is made of a metal material.

13. The vehicle of claim 1, further comprising:
a second load transfer assembly including third and fourth pivot pins and a second load beam, the third pivot pin fixed to a second bumper beam extension that extends laterally from a second end of the center beam, the fourth pivot pin fixed to the vehicle frame, and the second load beam having a third end pivotably coupled to the third pivot pin and a fourth end pivotably coupled to the fourth pivot pin,
wherein the second load beam is configured to load a second portion of the vehicle frame in a lateral direction upon the vehicle impact event.

14. The vehicle of claim 13, wherein the first and second portions of the vehicle frame deform toward each other during the vehicle impact event.

15. The vehicle of claim 1, wherein the first load beam is hollow.

\* \* \* \* \*